Figure 1:
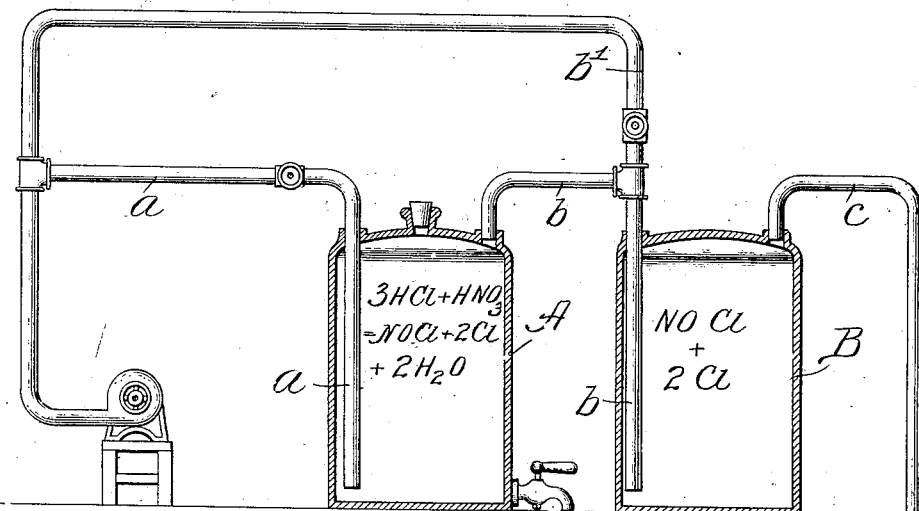

No. 863,684. PATENTED AUG. 20, 1907.
J. A. WESENER.
ART OF BLEACHING AND AGING FLOUR.
APPLICATION FILED APR. 20, 1907.
2 SHEETS—SHEET 2.
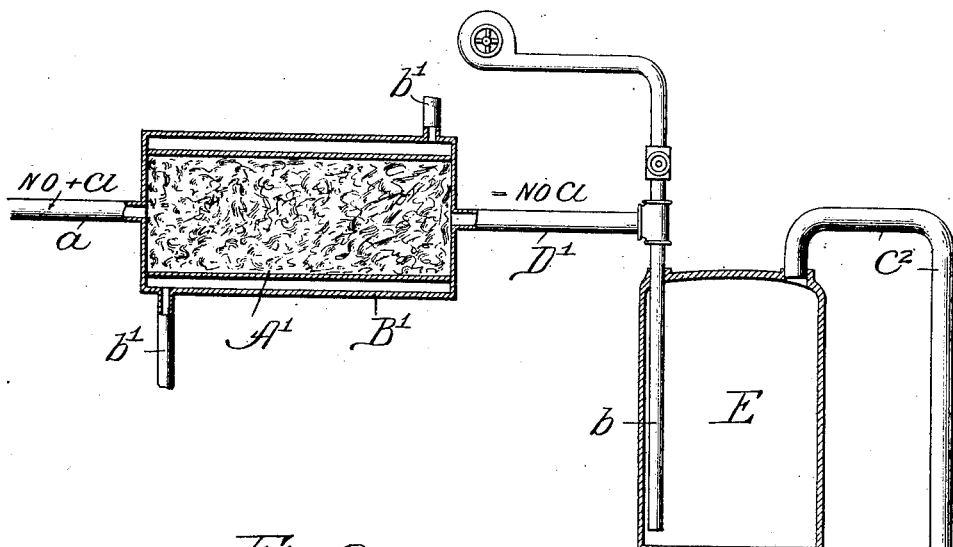
Fig. 2.
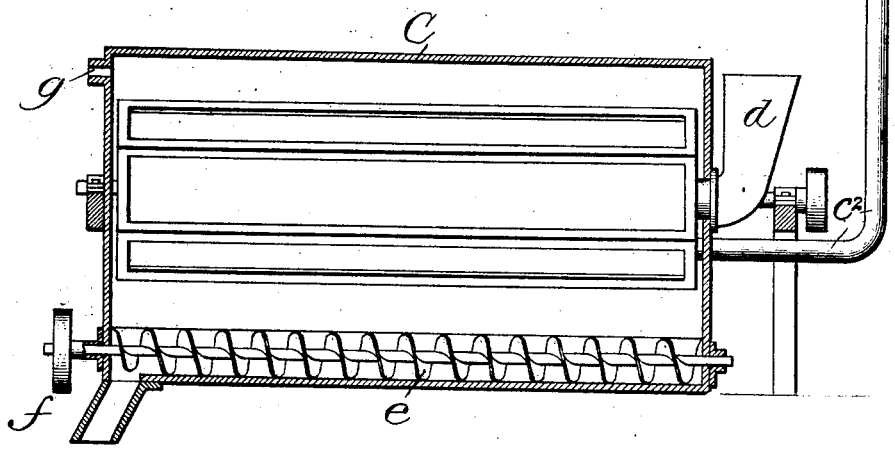
Witnesses:
Inventor:
John A. Wesener,
By Robert Catherwood
Atty.

UNITED STATES PATENT OFFICE.

JOHN A. WESENER, OF CHICAGO, ILLINOIS.

ART OF BLEACHING AND AGING FLOUR.

No. 863,684.    Specification of Letters Patent.    Patented Aug. 20, 1907.

Application filed April 20, 1907. Serial No. 369,221.

*To all whom it may concern:*

Be it known that I, JOHN A. WESENER, a citizen of the United States, residing at Chicago, in the county of Cook and State of Illinois, have invented certain new and useful Improvements in the Art of Bleaching and Aging Flour, of which the following is a specification.

My invention relates to improvements in the art of bleaching and aging flour.

I have discovered that by passing flour in a state of fine division through an inactive gas laden with a small quantity of free nitrosyl-chlorid gas so that the flour is brought into intimate contact therewith, that it may be bleached and aged immediately after grinding without injury to the bloom, taste or other characteristics of a high grade product.

My method affords a most simple, economical and efficient means of treating flour, the actual composition of which, as shown by analysis, after my treatment, being scarcely perceptibly altered, and detectable only by the most delicate reagents.

While my invention contemplates the use of a diluted nitrosyl-chlorid gas, I am aware that certain gases, such as chlorin, may be introduced into the charge without injury to the product, and, in some instances, adding to the efficiency of the nitrosyl-chlorid gas.

In practicing my process I pass an inactive gas, preferably air, through gases, such as carbon dioxid ($CO_2$) and nitrogen (N), may be used, containing a very small quantity of nitrosyl-chlorid gas (NOCl), into intimate contact with the flour to be bleached. The nitrosyl-chlorid may be produced by passing chlorin and nitric-oxid gases over heated charcoal, preferably animal charcoal, at, say, 40° to 50° C., whereby chemical union of chlorin and nitric-oxid is produced (Cl+NO=NOCl), or it may be obtained in any other convenient manner. I have found that certain gases may be added to advantage to dilute, regulate and restrain the activity of the nitrosyl-chlorid gas. I prefer to use chlorin and to produce the nitrosyl-chlorid and chlorin by the same operation. This I prefer to do by passing air through a mixture of hydrochloric and nitric acids $$3HCl+HNO_3=NOCl+2Cl+2H_2O),$$

expelling and diluting the mixture by passing air currents through it, and thereafter driving these air currents laden with very small quantities of the nitrosyl-chlorid and chlorin through a shower of the flour. Owing to the great activity of the free gas in the air current, a treatment for a few seconds only will be found sufficient. While the character of the flour is not materially altered, a chemical reaction has taken place in the coloring matter. In producing nitrosyl-chlorid and chlorin gases by the same operation I prefer to chemically unite by ordinary reaction 3½ to 4 parts by weight of hydrochloric acid with one part of nitric acid (the strength of the former being 1.158 specific gravity taken at 25° C. and of the latter 1.40 specific gravity taken at 25° C., heat to facilitate chemical action and evolution of nitrosyl-chlorid and chlorin ($3HCl+HNO_3=NOCl+2Cl+2H_2O$), and then feed this new compound to the inactive gas and proceed with the treatment of the flour by the air current laden with nitrosyl-chlorid and chlorin.

I am aware that intensifiers may be used for the purpose of evolving a regular and better flow of the nitrosyl-chlorid gas, and that dehydrating and catalytic agents may be employed to advantage.

I use the term "gas" herein to include not only mixtures of several gases, but a single gas as well, and when I speak of inactive gas or gaseous material, I mean a gas which will not combine or react with the active gaseous bleaching agents.

In the accompanying drawings I have illustrated a convenient apparatus for the preparation of nitrosyl-chlorid gas and nitrosyl-chlorid and chlorin gas and for their convenient application to flour in accordance with my invention.

Figure 1 is a sectional view showing apparatus for the preparation of nitrosyl-chlorid and chlorin and its application to the flour in a reel of the usual construction; Fig. 2 is a sectional view of apparatus for the preparation of nitrosyl-chlorid and its application to flour in a reel of the usual construction.

A indicates a glass or stoneware container holding nitro-hydrochloric acid; $a$ is a glass or porcelain tube through which air is forced; $b$ is a glass or porcelain tube through which the expelled air laden with the nitrosyl-chlorid and chlorin is passed into bottle B; $b'$ is a tube through which an additional supply of air may be forced into bottle B; $c$ is a tube or spout which carries to and is connected with the reel C or other suitable machine by which flour is sifted and finely divided for intimate contact with the gases; $d$ is a spout through which the flour is passed into the reel; $e$ is a conveyer by which the flour is discharged into the spout $f$ from which it may go to flour packers; $g$ is a vent.

In Fig. 2, A' is a porcelain lined iron tube in which is deposited loose lumps of animal charcoal; B' is a jacket surrounding tube A' through which, by means of the pipes $b'$ $b'$, water heated to approximately 40° to 50° C. is passed; $a'$ is a tube by which the mixed gases (NO+Cl) are carried into the larger tube A'; D' is the tube by which the nitrosyl-chlorid is carried to the mixing tank E, to be mixed with inert gases before treating the flour, the tank E being the equivalent of the tank B and communicating with the flour reel through the pipe $c_2$. It will thus be seen that where I employ nitrosyl-chlorid obtained from passing nitric-oxid and chlorin over heated animal charcoal I omit the use of container A.

Having thus described my invention, what I claim and desire to secure by Letters Patent is:

1. The improvement in the art of bleaching and aging flour, which consists in bringing it in intimate contact with an inactive gas containing a very small quantity of free nitrosyl-chlorid.

2. The improvement in the art of bleaching and aging flour, which consists in bringing it in intimate contact with an inactive gas laden with very small quantities of nitrosyl-chlorid gas.

3. The improvement in the art of bleaching and aging flour, which consists in bringing it in intimate contact with, and uniformly exposing it to, air laden with a very small quantity of nitrosyl-chlorid and chlorin gas.

4. The improvement in the art of bleaching and aging flour, which consists in passing it in a shower through air containing a very small quantity of nitrosyl-chlorid gas.

5. The improvement in the art of bleaching and aging flour, which consists in passing chemically inactive gaseous material through the mixture of hydrochloric acid and nitric acid, to expel and dilute the gaseous nitrosyl-chlorid and chlorin formed by said mixture, and in thereafter bringing the resultant gaseous mixture in intimate contact with the flour, substantially as described.

6. The improvement in the art of bleaching and aging flour, which consists in passing air through the mixture of hydrochloric acid and nitric acid, to expel and dilute the gaseous nitrosyl-chlorid and chlorin formed by said mixture, and in thereafter bringing the resultant gaseous mixture in intimate contact with the flour, substantially as described.

7. The improvement in the art of bleaching and aging flour, which consists in passing chemically inactive gaseous material through the mixture of three and one-half to four parts by weight of hydrochloric acid and one part of nitric acid, to expel and dilute the gaseous nitrosyl-chlorid and chlorin formed by said mixture, and in thereafter bringing the resultant gaseous mixture in intimate contact with the flour, substantially as described.

In testimony whereof I hereunto affix my signature in presence of two witnesses.

JOHN A. WESENER.

Witnesses:
CHARLES L. HINE,
ARTHUR NEENE.